N. ROBBINS.

Improvement in Stops for Sewing-Machines.

No. 131,182. Patented Sep. 10, 1872.

Witnesses.
A. Ruppert.
N. Bradford

Inventor.
Nathaniel Robbins
By his Attorney
J. M. Blanchard

UNITED STATES PATENT OFFICE.

NATHANIEL ROBBINS, OF ROCKPORT, MASSACHUSETTS.

IMPROVEMENT IN STOPS FOR SEWING-MACHINES.

Specification forming part of Letters Patent No. 131,182, dated September 10, 1872.

Specification describing a certain Improvement in Stops for Sewing-Machines, invented by NATHANIEL ROBBINS, of Rockport, in the county of Essex and State of Massachusetts.

This invention relates to that class of devices which are used upon sewing-machines for the purpose of stopping their movements when by accident they are started in a wrong direction; and it consists in an eccentric elastic stop applied to the periphery of the balance or fly wheel in such a manner that by its eccentricity it shall act upon said wheel whenever it is turned or started in the wrong direction and thus arrest its movement, while it leaves the wheel free to turn in the proper direction without offering any appreciable amount of resistance.

Figure 1:
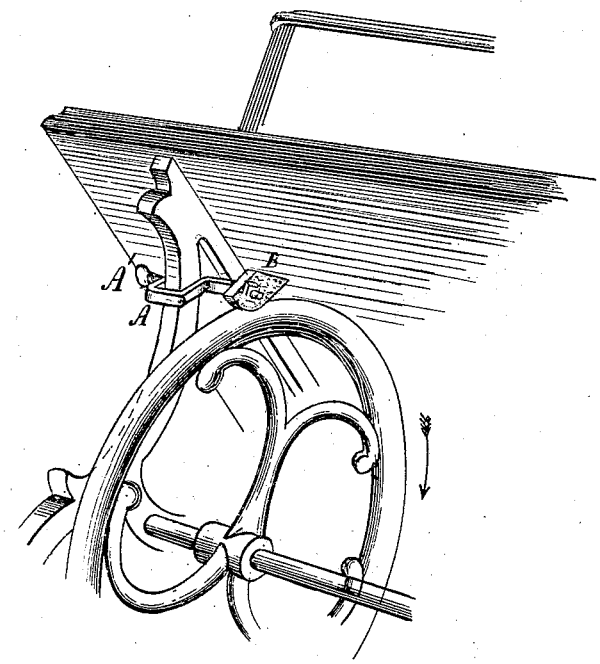
Figure 2:
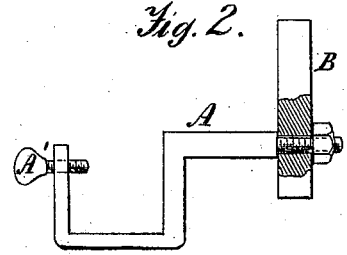

Figure 1 is a perspective view of a portion of a sewing-machine with my improved stop applied to its balance-wheel. Fig. 2 is an elevation of such stop, and of the yoke or clasp for attaching it to the frame of the machine.

Corresponding letters refer to corresponding parts in both figures.

In constructing devices of this character I use a clamp, A, of the form shown in the drawing, or of any other form that will serve to hold the stop in position. That portion of this clamp which embraces the frame of the machine may be of the form shown in Fig. 2, and be provided with a set-screw, A', for securing it in position, while its opposite end is to be provided with a cylindrical seat or bearing for the elastic eccentric, and is to have a nut and washer upon the outside of such eccentric to prevent it from coming off from the clamp. The eccentric B is placed upon the rounded portion of the clamp A, and in such a position that it will rest upon the periphery of the fly-wheel, and so that when said wheel is turning in the proper direction it will just rest upon its surface, but will, owing to its eccentricity or form, press upon said wheel with sufficient force to arrest its movement when said wheel is started in the wrong direction. This eccentric may be made of hard leather, gutta-percha, or India rubber of the proper degree of hardness, or of any other material having the requisite amount of elasticity to cause it to arrest the movement of the wheel without causing a sudden shock upon the machine, such elasticity being a very essential element in the operation of the device.

This eccentric stop is applicable to all sewing-machines which are provided with a balance-wheel, it being only necessary to vary the clasp so as to attach it to some stationary part of such machine.

What I claim as my invention, and desire to secure by Letters Patent, is—

The elastic and eccentric stop B and clamp A, in combination with the balance-wheel and frame or other stationary portion of a sewing-machine, substantially in the manner and for the purpose specified.

NATHANIEL ROBBINS.

Witnesses:
ALFRED PARSONS,
JOHN S. KNIGHTS.